(No Model.)

A. T. SULLIVAN.
ANIMAL TRAP.

No. 433,377. Patented July 29, 1890.

Witnesses

Alonzo T. Sullivan
Inventor by 
Attorney

UNITED STATES PATENT OFFICE.

ALONZO T. SULLIVAN, OF MALCOLM, NEBRASKA.

ANIMAL-TRAP.

SPECIFICATION forming part of Letters Patent No. 433,377, dated July 29, 1890.

Application filed March 21, 1890. Serial No. 344,837. (No model.)

*To all whom it may concern:*

Be it known that I, ALONZO T. SULLIVAN, a citizen of the United States of America, residing at Malcolm, in the county of Lancaster and State of Nebraska, have invented certain new and useful Improvements in Mouse-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain new and useful improvements in mouse-traps, the same being designed as an improvement upon the mouse-trap patented to me February 11, 1890, No. 421,329, and in this application I embody the construction shown in said patent.

The present invention consists in providing a shield which extends from the entrance-gate upwardly, so as to form a separate compartment which will contain the upper portion of the sliding door and depending hook which engages therewith, so that the mouse or other animal cannot come in contact with the end of the rod connecting with the sliding door, as will be hereinafter fully set forth, and particularly pointed out in the claims.

Figure 1:
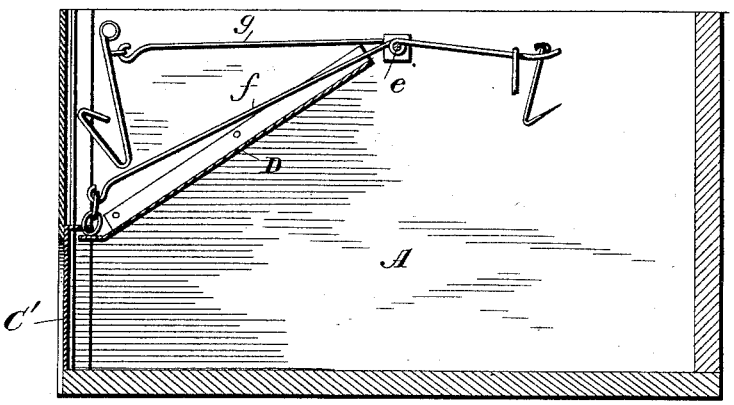
Figure 2:
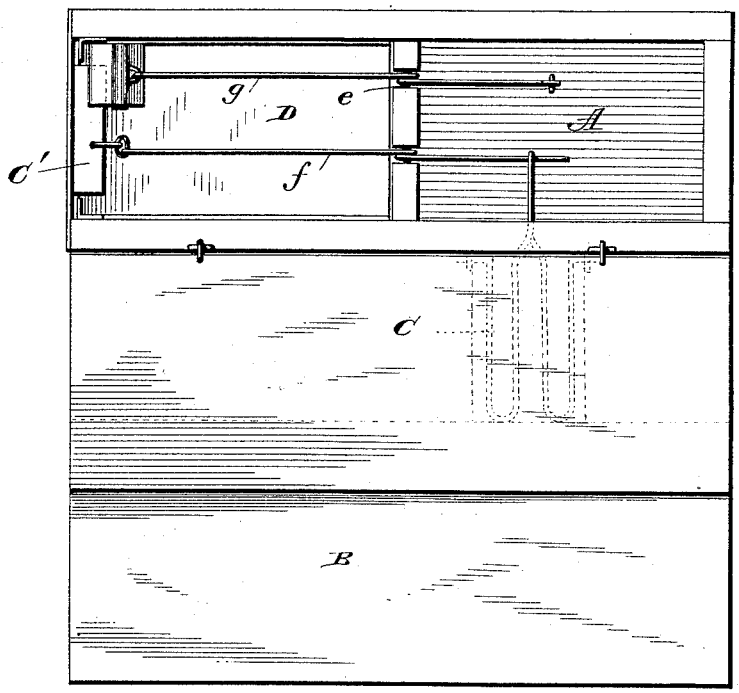
Figure 2:
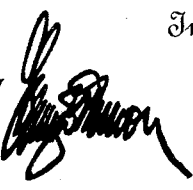

In the accompanying drawings, Figure 1 is a sectional view of a mouse-trap constructed in accordance with my present invention. Fig. 2 is a plan view with the cover turned back.

A refers to one of the compartments of the trap, and B the other compartment, which communicate by an opening protected by a hinged door or gate C, which is connected to the pivoted rod $f$, so that when the gate C is raised one end of the pivoted rod $f$ will be depressed to elevate the gate C'. The rod $g$ has at one end a bait-hook, while the other end engages with a swinging catch for holding the gate C' in an elevated position when in engagement with said hook, all as will more fully appear by reference to my prior patent, hereinbefore referred to.

I have found that it is advisable to provide a trap constructed as shown in the aforementioned patent with a guard or shield D, which extends from the under side of the cross-bar $e$, upon which the rods $f$ and $g$ are pivoted, to the upper edge of the gateway, so as to prevent animals, after being caught in the compartment A, lifting the gate. This inclined shield is preferably made of tin, the lower end being bent horizontally, as shown, the sides being bent to provide flanges for connecting the same to the inner sides of the compartment A. This shield also reduces the size of the compartment A, so that the animal caught therein will more readily pass beneath the inclined gate C, by reason of the approach to the latter being not so contracted. By providing the inclined plate D, as set forth, those portions of the operating-rods more immediately adjacent to the gate C', and which depend more or less, occupy a position above the plate D, and are therefore protected against being partly vibrated by the mouse within the chamber jumping against the same, and hence avoiding any opening of said gate C', other than by the movement of gate C.

Having thus described my invention, I claim—

1. In a mouse-trap having a sliding door, a hook for holding the same in a raised position, pivoted rods $f$ and $g$, and a shield or inclined plate D, extending from the pivot-point of said rods $f$ and $g$ downwardly adjacent to the upper edge of the entrance-opening, so that said rods will be above said plate, substantially as set forth.

2. The combination, in a mouse or animal trap constructed substantially as shown, of a compartment A, having an entrance-opening, a sliding gate, a pivoted hook for maintaining said gate in an elevated position, rods $f$ and $g$, connected to the gate and hook, and a shield D beneath said rods and which inclines from the upper portion of the compartment A downwardly toward the door, the sides thereof being bent for attachment to the sides of the compartment A, while the lower end is bent horizontally, so that the upper bent end of the sliding door can rest thereon, substantially as set forth.

In testimony whereof I affix my signature in presence of two witnesses.

ALONZO T. SULLIVAN.

Witnesses:
WM. BRANDT, Jr.,
J. CARPENTER.